United States Patent Office 3,567,711
Patented Mar. 2, 1971

3,567,711
PREPARATION OF α - HYDROXYLAMINO LACTAMS BY HYDROGENATION OF α-NITRO LACTAMS
Jan Frans Van Peppen, Chester, N.J., assignor to Allied Chemical Corporation, New York, N.Y.
No Drawing. Filed Sept. 30, 1969, Ser. No. 862,514
Int. Cl. C07d 41/06
U.S. Cl. 260—239.3                              9 Claims

ABSTRACT OF THE DISCLOSURE

α-Nitrolactams can be catalytically hydrogenated using palladium-on-charcoal catalyst to afford $C_5$–$C_{12}$ α-hydroxylamino lactams which are novel compositions of matter. These α-hydroxylamino lactams have biodynamic properties, including herbicidal, insecticidal, fungicidal, and acaricidal. Additionally, they are useful as transition metal chelating agents. They can also be oxidized to oximino lactams which are known chelating agents.

BACKGROUND OF THE INVENTION

This invention relates to a novel class of compounds, specifically to α-hydroxylamino lactams of the structure:

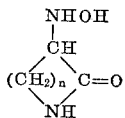

wherein $n$ ranges from 3 to 10, and to a process for producing such compounds by the catalytic hydrogenation (reduction) of α-nitrolactams:

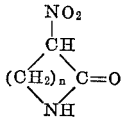

wherein $n$ is as defined above.

The hydroxylamino lactam compounds of the instant invention are useful as chelating agents. Specifically, they have been found effective at complexing transition metal ions such as copper, nickel, zinc, molybdenum, and the like, in aqueous or alcoholic solution. In fertilizer applications chelates of micronutrients such as copper and nickel with the α-hydroxylamino lactams of the instant invention resist leaching and hence enable plants to which such chelates have been applied to actually adsorb a greater percentage of the applied micronutrient. Additionally, the α-hydroxylamino lactams of the instant invention have been found to possess herbicidal, insecticidal, fungicidal, and acaricidal activity.

Lactams of 5 to 12 carbon atoms are all compounds well known to the prior art. Caprolactam, which has 6 carbon atoms and the dodecyl ($C_{12}$) lactam, for example, are produced in multimillion-pound quantities annually for transformation into nylon 6 and nylon 12, respectively. The $C_5$ to $C_{12}$ α-nitro caprolactams are produced by phosgenation and then nitration of the lactams as reported, for example, in British Pat. No. 901,169 and in U.S. Pat. No. 3,093,365.

The prior art has, however, never reported the preparation of any α-hydroxylamino lactams either by reduction, i.e., catalytic hydrogenation of the known α-nitro lactams, or by any other method.

The failure of prior-art workers to prepare the α-hydroxylamino lactams by reduction of the corresponding α-nitro compound is doubtless owing to the fact that ordinary catalytic hydrogenation methods, when applied to an α-nitro lactam, afford either the fully reduced α-amino lactam or a mixture thereof with the partially reduced α-hydroxylamino lactam. For example, U.S. Pat. No. 3,048,580 reports the essentially quantitative reduction of α-nitrocaprolactam to α-amino caprolactam using palladium-on-carbon catalyst.

The prior art does teach certain catalytic hydrogenation methods for reducing nitro-normal and cycloalkanes to the corresponding hydroxylamino alkanes. Unfortunately, in catalytic hydrogenation, the configuration and polarity of the molecule being reduced is of crucial significance in determining the course of the partial hydrogenation of a functional group which is substituent on such molecule. Hence, methods suitable for reducing nitroalkanes to the corresponding hydroxylamino compound would not be expected to be suitable for nitro lactams.

U.S. Pat. No. 2,829,163 teaches the reduction of nitrocyclohexane to hydroxylamino cyclohexane by catalytic hydrogenation in an equimolar 10% aqueous acetic acid solution at 20° C. using palladium-on-alumina catalyst.

Meister et al. (Ann. Chemie, 674, 83, 1964, at 89, and U.S. Pat. No. 2,886,496) describe the catalytic reduction of nitrocyclododecane to hydroxylamino cyclododecane using as catalyst palladium on various supports.

U.S. Pat. No. 3,393,237 describes the reduction of nitrocyclohexane to cyclohexylhydroxylamine by the use of palladium on carbon treated with an amine "selectivity agent." However, even if it is effective such selectivity agent is a product contaminant and requires removal therefrom.

I have found the procedures described in these references are unsuitable for the partial reduction of α-nitro lactams.

An article by Guyer and Merz [Chimia, 18, 144 (1964)], teaches the reduction of nitrocyclohexane to hydroxylamino cyclohexane using palladium on carbon in aqueous hydrochloric acid at room temperature. Such a method would, of course, be unsuitable to reduce α-nitrolactams, since the acid would cause opening of the lactam ring.

U.S. Pat. No. 2,967,200 teaches that reduction of nitrocyclohexane and other nitroalkanes using palladium-on-carbon gives mainly the amine plus some oxime. When poisoned with lead compounds, the oxime is the major product.

British Pat. No. 797,985 describes the catalytic reduction of nitrocycloalkanes to cycloalkyl oximes using palladium-on-carbon catalyst modified by treatment with a lead salt.

It is thus apparent that the prior art workers not only had never prepared α-hydroxylamino lactams, but also were unaware of a simple, straightforward rapid method that would clearly be applicable to such preparation. Specifically, the prior art did not teach a rapid catalytic method suitable for transforming α-hydroxylamino lactams essentially uncontaminated with side products.

SUMMARY OF THE INVENTION

It is an object of this invention to provide a novel class of compounds, specifically $C_5$ to $C_{12}$ α-hydroxylamino lactams that are useful as chelating agents and that also have valuable biodynamic properties.

It is a further object of this invention to provide a catalytic process for preparing such α-hydroxylamino lactams from readily available starting materials, i.e., the α-nitrolactam of the same number of carbon atoms.

Further objects and advantages will become apparent from the description of the invention which follows in greater detail.

These and other objects are accomplished according to our invention wherein $C_5$ to $C_{10}$ α-nitrolactams are catalytically reduced to α-hydroxylaminolactams.

The preferred nitrolactam is α-nitrocaprolactam because of the cheapness and ready availability of the starting material—caprolactam from which the nitrolactam is prepared as previously described.

The catalyst useful in the reduction, i.e., hydrogenation, process of the instant invention is palladium on charcoal, also referred to as palladium on active carbon. The preparation of such palladium-on-carbon catalyst is well known in the art. Such preparation is described, for example, in Organic Synthesis, vol. 3 (1955), at pp. 385 and 685. Suitable catalyst is sold by Baker and Co., Newark, N.J., U.S.A.

I have found the weight ratio of palladium to carbon is not particularly critical since the carbon serves merely as a support for the palladium, which is the active catalyst constituent. Ordinarily, from 0.1–10.0 weight percent palladium on carbon is suitable—preferably 2.0–6.0 weight percent. A suitable palladium-to-nitrolactam ratio can vary over wide limits depending upon the reduction time and other reduction conditions desired. Ordinarily, a nitrolactam-to-palladium weight ratio of from about 50:1 to about 1000:1 is suitable—preferably 100:1 to 500:1.

A suitable hydrogenation temperature is from about 20° to 80° C., preferably about 50°–70° C. Temperatures below 20° C. do not give suitable hydrogenation rates coupled with adequate selectivity. By adequate selectivity is meant that the nitrolactam is reduced essentially completely and exclusively to the hyldroxylamino lactam. Above about 80° C. significant quantities of undesirable further reduction products, e.g., aminolactam, are obtained.

Since the α-nitrolactams are solids, the hydrogenation is most advantageously carried out on a solution or partial solution of the α-nitrolactam in an organic solvent. By partial solution is meant that sufficient solvent is present to dissolve at least about 10% of the nitrolactam at the hydrogenation temperature. As the dissolved nitrolactam is reduced, more nitrolactam will be dissolved and then reduced. Preferably, sufficient solvent is present to completely dissolve all the nitrolactam at the hydrogenation temperature. Since the hydroxylamino lactam is ordinarily more soluble than the nitrolactam, sufficient solvent to dissolve all the nitrolactam at the hydrogenation temperature is generally also sufficient to dissolve the hydroxylamino lactam product at room temperature, which is desirable in that it facilitates separation of the product from the palladium-on-carbon catalyst following hydrogenation.

The chemical nature of the hydrogenation solvent is not critical; it is essentially subject to only one limitation that is the solvent must be insert, i.e., it should not react with either the reactant or the product and, of course, not be itself subject to hydrogenation under the prevailing conditions. Preferably the solvent is sufficiently miscible with water to form a homogeneous phase with the water produced during reduction. Preferably also, the nitrolactam should be soluble therein to the extent that at least about 10% of the hydrogenation temperature. Most preferably, both the nitrolactam and the hydroxylamino lactam will be soluble to a greater extent so as to facilitate the recovery of the hydrogenation product and eliminate the need for handling large volumes of solvent.

The hydrogenation solvent is preferably a $C_1$–$C_4$ alcohol, e.g., methanol, ethanol, n- or isopropanol, t-butanol, or a mixture thereof, which alcohol can be anhydrous or can contain up to about 50 volume percent water. Most preferably the solvent is ethanol containing 10 to 50 volume percent water.

Most conveniently, catalyst, nitrolactam and solvent are added to a pressure vessel and the nitrolactam dissolved in the solvent by shaking and mild heating. The vessel is then purged of air and sufficient hydrogen introduced to provide a pressure of 15–2000 p.s.i.g. at the desired hydrogenation temperature, i.e., 20°–80° C. The vessel and its contents are then heated to, and maintained at, the desired temperature, preferably with simultaneous agitation achieved, e.g., by stirring, or by shaking or rocking the vessel. Hydrogenation is ordinarily complete in from about 10 to 200 minutes and is indicated by a substantial decrease or cessation in the rate of hydrogen uptake. If desired, hydrogen can be introduced continuously during the reduction reaction until 2 mols of hydrogen has been utilized per mol of nitrolactam.

The reaction can be represented as follows:

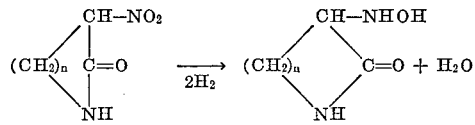

The vessel is then cooled to room temperature and vented. The reaction mixture is then filtered or decanted to separate the palladium-on-charcoal (carbon) catalyst and the filtrate, which consists of the hydroxylamino lactam product, solvent and one mol of water per one mol of nitrolactam formed in the reduction, then evaporated to afford crude hydroxylamino lactam as a residue. If desired, this residue may be further purified by recrystallization from a solvent such as methanol, water, or a mixture thereof.

The invention can be more fully understood by reference to the following examples. All parts are parts by weight unless otherwise expressly noted.

EXAMPLE 1

A solution of 3.16 grams (20 millimols) of nitrocaprolactam in 200 ml. of 40% aqueous acetic acid solution was hydrogenated using 0.316 gram of 10% palladium-on-alumina catalyst. The hydrogenation temperature was 26°–29° C. and the hydrogen pressure varied from 30 to 60 p.s.i. during hydrogenation with additional hydrogen being added to replace that which was used up in the reduction reaction. After 15 minutes, hydrogen uptake was 25 millimols. The reaction was stopped at this point, the catalyst removed by filtration, and the product analyzed by thin layer chromatography and titration which indicated that the reaction product contained approximately 4.9 millimols of α-hydroxylamino caprolactam, 4.4 millimols of α-oximinocaprolactam, and 2.5 millimols of α-amino caprolactam, plus unreacted nitrocaprolactam and other unidentified products. It is thus apparent that even a large excess of 40% aqueous acetic acid will not trap the desired hydroxylamino intermediate reduction product and thereby prevent the formation of further products when using this catalyst.

EXAMPLE 2

A solution of 3.16 grams (20 millimols) of nitro caprolactam in 80 ml. of ethanol was hydrogenated over a catalyst consisting of 0.316 gram of 5% palladium on calcium carbonate. Hydrogenation temperature was 40° C. and the hydrogen pressure was maintained at 50–60 p.s.i. during hydrogenation. After 174 minutes, 12.9 millimols of hydrogen had been consumed and replaced by adding additional hydrogen. The reaction was terminated at this point and the product analyzed by thin layer chromatograph and titration. The reaction product was indicated to be a mixture containing about 3.1 millimols of hydroxylamino caprolactam, 1.8 millimols of α-oximino caprolactam and 0.3 millimol of α-amino caprolactam.

EXAMPLE 3

A solution of 3.16 grams nitrocaprolactam in 80 ml. of ethanol was hydrogenated over 0.316 gram of 1% palladium on alumina at 20° C. and 60 p.s.i.g. hydrogen pressure for a period of 17 hours. A total of 40.1 millimols of hydrogen was consumed and was replaced. Thin layer chromatography and titration of the product indicated it to be a mixture containing approximately 13.2 millimols α-hydroxylaminocaprolactam, 4.5 millimols α-oximino caprolactam and 2.5 millimols α-aminocaprolactam.

EXAMPLE 4

The reduction was carried out as in Example 5 except the catalyst was 1% palladium on calcium carbonate and the hydrogenation was carried out for 18 hours. Thin layer chromatographic analysis and titration of the product showed it to be a mixture containing 3.5 millimols α-oximino caprolactam, 6.9 millimols α-aminocaprolactam, 6.1 millimols α-hydroxylaminocaprolactam and 3.5 millimols α-nitrocaprolactam.

EXAMPLE 5

To 3.16 grams (20 millimols) of nitrocaprolactam in 70 ml. of ethanol in a pressure vessel was added 10 ml. of n-butylamine and 0.316 gram of 5% palladium on charcoal. The mixture was heated to 60° C. under nitrogen and the nitrogen then replaced with hydrogen at 65 p.s.i.g. The vessel was then sealed and agitated for 47 minutes. After venting, decantation from the catalyst, and stripping off the ethanol and butylamine, the product was analyzed by thin layer chromatography and shown to contain approximately equal amounts of α-hydroxylamino caprolactam and α-amino caprolactam, thus indicating the ineffectiveness of amine selectivity agents on the reduction of nitrocaprolactam with palladium on charcoal.

EXAMPLE 6

A solution of 3.16 grams (20 millimols) of α-nitrocaprolactam in 80 ml. of anhydrous ethanol was hydrogenated using 0.316 gram of 5% palladium-on-carbon catalyst in a Parr hydrogenation apparatus at 40° C. Hydrogenation was carried out by pressuring the Parr vessel containing the palladium-on-carbon catalyst and nitrocaprolactam to 60 p.s.i. with hydrogen at ambient temperature and then heating the vessel and the contents thereof to 40° C. with concomitant agitation. The pressure fluctuated between being admitted periodically to replace that which had been taken up by reaction. Hydrogen uptake was complete after about 40 minutes. The reaction mixture was removed from the Parr vessel, the catalyst removed by filtration, and the reaction solution analyzed by thin layer chromatography.

The chromatographic analysis indicated that the predominant reaction product was α-hydroxylamino caprolactam. Very small amounts of α-amino caprolactam and α-oximino caprolactam were also present. All nitrocaprolactam had been reduced.

EXAMPLE 7

A solution of 31.6 grams (200 millimols) of nitrocaprolactam in 800 ml. of 50% aqueous ethanol was hydrogenated using 3.16 grams of 5% palladium-on-carbon catalyst. The hydrogenation temperature was 60°–64° C. The pressure was maintained through the hydrogenation at 50–60 p.s.i. Hydrogen uptake ceased after 11 minutes of gentle agitation at the above-indicated temperature. The reaction mixture was filtered to remove catalyst and the solvent removed by evaporation at reduced pressure. A syrupy residue remained. This residue was analyzed by thin layer chromatography which indicated the presence of 175 millimols of hydroxylamino caprolactam and 4.7 millimols of amino caprolactam. The hydroxylamino caprolactam was recovered by stirring the residue for one hour at room temperature with 200 ml. of glyme (1,2-dimethoxy ethane). This stirring procedure resulted in crystal formation. Recovery of the crystals by filtration afforded 21.5 grams of hydroxylamino caprolactam which melted after recrystallization at 150–152° C.

EXAMPLE 8

A series of α-nitrolactams were reduced using the following hydrogenation conditions. 10 g. of nitrolactam was dissolved in 250 ml. of 70% aqueous ethanol, and the solution placed in a glass pressure vessel. 1.0 g. of 5% palladium on charcoal was added and the vessel then sealed, degassed, and a hydrogen atmosphere introduced. The vessel contents were then heated to 65° C., additional hydrogen introduced to provide a hydrogen pressure of 100 p.s.i.g. and the vessel agitated until there was no significant further drop in hydrogen pressure. The vessel was then vented, the catalyst filtered off and the filtrate evaporated at reduced pressure. Thin layer chromatographic analysis of the evaporation residue indicated in all cases that:

(1) No α-nitro compound was present.
(2) The α-oximino compound was either completely absent or present only in trace amounts.
(3) The major product was the desired α-hydroxylamino lactam with a minor product being α-aminolactam.
(4) The α-amino lactam never amounted to more than 7% mol based on α-hydroxylamino lactam.

The following α-nitrolactams were reduced:

α-nitrovalerolactam
α-nitrocaprylalactam
α-nitroaurolactam

The results of the above experiments indicate that only palladium-on-charcoal is capable of reducing α - nitrolactams to α-hydroxylamino lactams without the production of significant amounts of side reduction products.

I claim:
1. A process for producing an α-hydroxylamino lactam of the structure

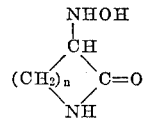

wherein $n$ is 3 to 10, which comprises contacting a solution of α-nitrolactam of the structure

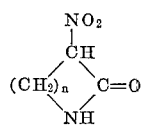

wherein $n$ is as defined above, in an inert solvent in the presence of 0.1 to 10 wt. percent palladium-on-charcoal catalyst, wherein the weight ratio of α-nitrolactam to palladium ranges from about 50:1 to 1000:1, with hydrogen at a pressure of 15 to 200 p.s.i.g. at a temperature of 15° to 80° C. for a time sufficient to effect reduction of said α-nitrolactam to said α-hydroxylamino lactam.

2. A process in accordance with claim 1 wherein said catalyst is 2.0 to 6.0 weight percent palladium-on-charcoal.

3. A process in accordance with claim 1 wherein said nitrolactam to palladium weight ratio is 100:1 to 500:1.

4. A process in accordance with claim 1 wherein the temperature is 50° C. to 70° C.

5. A process in accordance with claim 1 wherein the solvent is a $C_1$ to $C_4$ alcohol or mixture thereof with up to 50 volume percent water.

6. A process in accordance with claim 5 wherein the solvent is ethanol containing 10 to 50 volume percent water.

7. A process in accordance with claim 1 wherein said α-nitrolactam is α-nitrocaprolactam.

8. A compound of the structure

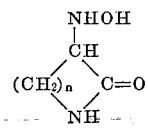

wherein $n$ is 3 to 10.

9. The compound of claim 8 which is α-hydroxylamino caprolactam.

References Cited

UNITED STATES PATENTS 3,048,580   8/1962   Ottenheym et al. _____ 260—239.3

HENRY R. JILES, Primary Examiner

R. T. BOND, Assistant Examiner

U.S. Cl. X.R.

71—83, 88, 94, 95; 252—182; 260—270, 294.7, 299, 326.5, 424—244, 267, 274

PO-1050
(5/69)

UNITED STATES PATENT OFFICE
CERTIFICATE OF CORRECTION

Patent No. 3,567,711    Dated March 2, 1971

Inventor(s) Jan Frans Van Peppen

It is certified that error appears in the above-identified patent and that said Letters Patent are hereby corrected as shown below:

Claim 1, column 6, line 66, "200" should be --2000--;

and

"15°" should be --20°--.

Signed and sealed this 14th day of March 1972.

(SEAL)
Attest:

EDWARD M. FLETCHER, JR.
Attesting Officer

ROBERT GOTTSCHALK
Commissioner of Patents